United States Patent
Mun et al.

(10) Patent No.: US 12,065,305 B2
(45) Date of Patent: Aug. 20, 2024

(54) SPACE DIVISION DEVICE

(71) Applicants: HYUNDAI MOTOR COMPANY, Seoul (KR); KIA CORPORATION, Seoul (KR)

(72) Inventors: Hyeon Sik Mun, Gwangju (KR); Sang Cheon Kim, Hwaseong-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 453 days.

(21) Appl. No.: 17/388,741

(22) Filed: Jul. 29, 2021

(65) Prior Publication Data
US 2022/0185579 A1    Jun. 16, 2022

(30) Foreign Application Priority Data
Dec. 14, 2020 (KR) .................. 10-2020-0173965

(51) Int. Cl.
*B65D 90/00* (2006.01)
*B60P 7/14* (2006.01)

(52) U.S. Cl.
CPC ............ *B65D 90/0066* (2013.01); *B60P 7/14* (2013.01); *B65D 2590/005* (2013.01)

(58) Field of Classification Search
CPC .. B65D 90/00; B65D 90/004; B65D 90/0046; B65D 90/0053; B65D 90/006; B65D 90/0066; B65D 2590/005; B65D 2590/0041; B65D 2590/02; B60P 7/14; B60P 7/135
See application file for complete search history.

(56) References Cited

U.S. PATENT DOCUMENTS

| | | | | |
|---|---|---|---|---|
| 3,986,605 A * | 10/1976 | Dooley | ................. | B65G 13/00 198/747 |
| 4,049,311 A * | 9/1977 | Dietrich | ................... | B60P 7/14 410/139 |
| 5,472,300 A * | 12/1995 | Lipschitz | ................. | B60J 5/062 410/139 |
| 5,961,171 A * | 10/1999 | Iijima | ..................... | B60P 7/135 220/531 |
| 6,340,136 B1 * | 1/2002 | Luria | ..................... | B65G 1/133 244/118.1 |
| 6,799,933 B1 * | 10/2004 | Wasinger | ............... | B65G 67/20 414/509 |
| 8,087,859 B2 * | 1/2012 | Nelson | ................. | B61D 45/006 410/130 |
| 9,452,794 B1 * | 9/2016 | Jennison | ................. | B60P 1/003 |
| 10,479,418 B1 * | 11/2019 | Patel | ................. | B65D 90/0066 |
| 11,498,627 B2 * | 11/2022 | Patel | ................. | G06Q 10/0832 |

(Continued)

FOREIGN PATENT DOCUMENTS

KR 10-1998-045232 A 7/1999
KR 10-2016-0000601 A 1/2016

*Primary Examiner* — Chi Q Nguyen
(74) *Attorney, Agent, or Firm* — Lempia Summerfield Katz LLC

(57) ABSTRACT

A space division device includes: a rail installed on an upper side of a space box along a first direction of the space division device, a drive module that is installed to be movable along the rail, and a first partition that is connected to the drive module and forms a surface in a second direction perpendicular to the first direction to partition an inner space of the space box.

10 Claims, 5 Drawing Sheets

(56) References Cited

U.S. PATENT DOCUMENTS

2014/0255137 A1\* 9/2014 Haertel .................... B64D 9/00
                                                                                      414/529
2017/0106966 A1\* 4/2017 Himmelmann ........... B64C 1/22
2019/0315473 A1\* 10/2019 Mochizuki ......... B64D 11/0648

\* cited by examiner

SPACE DIVISION DEVICE

CROSS-REFERENCE TO RELATED APPLICATIONS

This application claims priority to and the benefit of Korean Patent Application No. 10-2020-0173965, filed on Dec. 14, 2020, the entire contents of which are incorporated herein by reference.

FIELD

The present disclosure relates to a technology for a device that divides a certain space into various states.

BACKGROUND

The statements in this section merely provide background information related to the present disclosure and may not constitute prior art.

The interior of a box truck or container can be used as a space for a certain cargo load.

As described above, a certain space can be provided with a cover and a wall, and be used in a form fixed on the ground. Herein as desired, a container that can be mounted on a vehicle or a box truck that can be moved by itself is collectively referred to as "space box".

That is, the present disclosure relates to a technology for a device that divides the inner space of the space box.

The matters described as the background technology of the present disclosure are only intended to help understanding of the background of the present disclosure, and should not be taken as acknowledging that they correspond to the prior art already known to those of ordinary skill in the art.

SUMMARY

The present disclosure provides a space division device capable of easily dividing the inner space of a space box into the size and shape desired by a user. In particular, it is to provide a space division device capable of maximizing user convenience by providing that the divided spaces are reliably blocked from each other, so that the cargoes are not mixed and independent spaces can be stably maintained.

In one form of the present disclosure, a space division device includes: a rail that is installed on an upper side of a space box and forms a straight line along a first direction of the space division device, a drive module that is installed to be movable along the rail, and a first partition that is connected to the drive module and configured to form a surface in a second direction perpendicular to the first direction to partition an inner space of the space box.

The rail may be an upper rail installed on an upper side of the space box.

A lower rail may be provided at a lower side of the space box parallel to the upper rail, and a lower end of the first partition may be configured to be guided by the lower rail.

A second roller of which rolling motion is guided by the lower rail may be provided at the lower end of the first partition.

The drive module may include a first roller of which rolling motion is guided by the rail, a drive motor, and a drive worm that is rotated by a rotational force of the drive motor while engaged with a rack gear provided on the rail along a longitudinal direction.

The drive module may include at least one second partition that can be rotated with respect to the first partition around a long axis of rotation in a vertical direction of the space division device.

In one form, the at least one second partition includes a plurality of second partitions, and each second partition of the plurality of second partitions may be provided symmetrically with respect to a direction of both surfaces of the first partition.

The drive module may further include a partition rotation motor that provides a rotational force to rotate the at least one second partition, and a reducer that reduces a power of the partition rotation motor and transmits it to the at least one second partition.

The reducer may include a single pinion planetary gear device, and the single pinion planetary gear device includes: a ring gear fixed to the drive module, a sun gear connected to a rotation shaft of the partition rotation motor, and a carrier connected to the second partition.

The space division device includes at least two partition modules provided on the rail and each including the drive module and the first partition.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
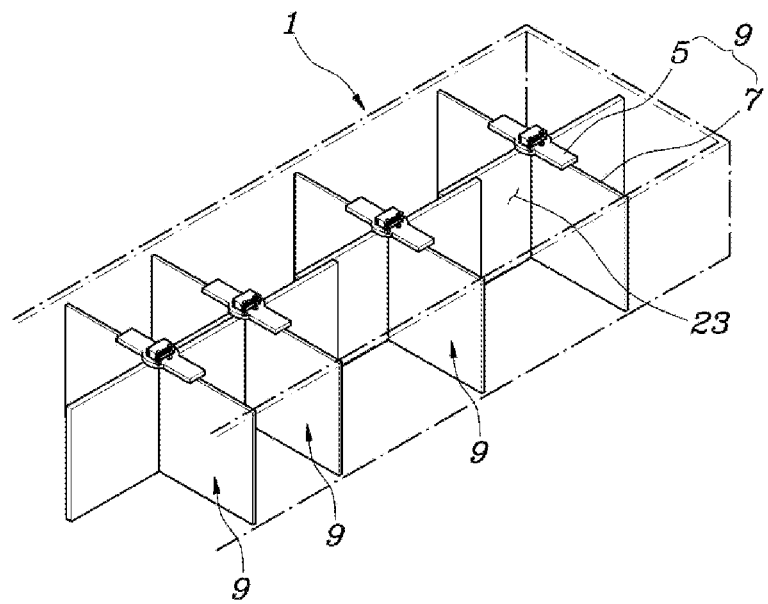
FIG. 1 is a diagram illustrating a space box to which a space division device according to one form of the present disclosure is applied.
Figure 2:
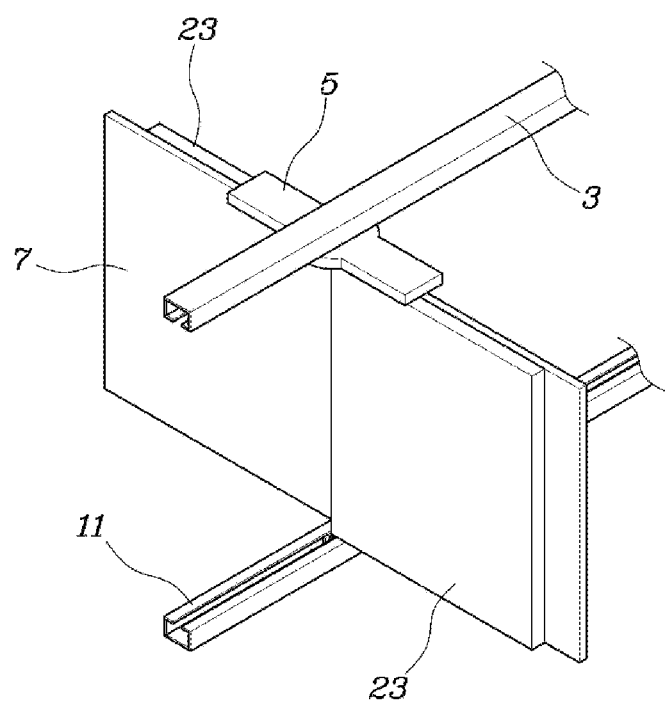
FIG. 2 is a diagram showing in detail a part of FIG. 1.
Figure 3:
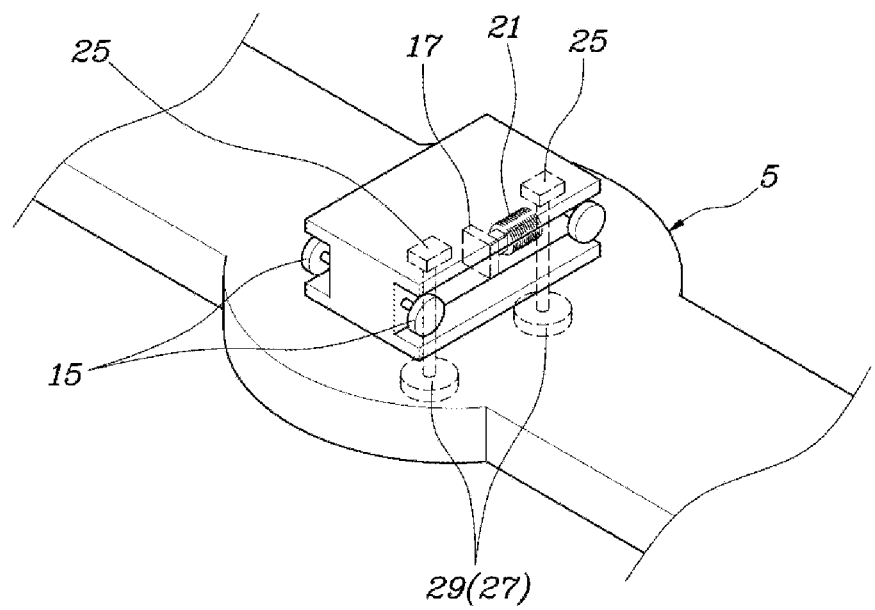
FIG. 3 is a diagram showing in detail the drive module of FIG. 2.
Figure 4:
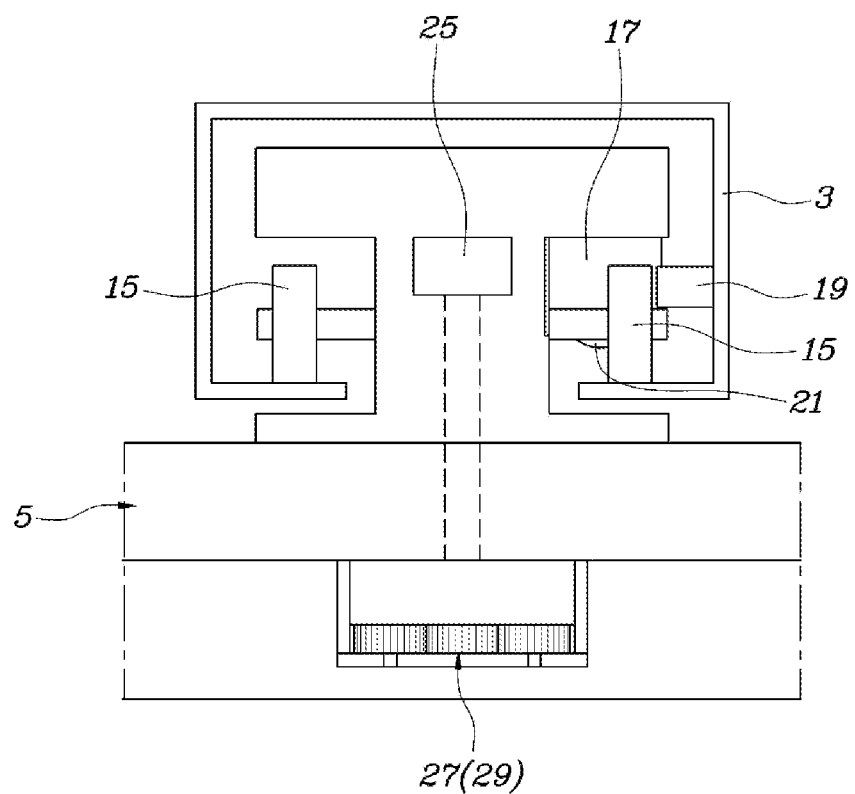
FIG. 4 is a diagram of the drive module installed on an upper rail viewed along the longitudinal direction of the upper rail.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Specific structural or functional descriptions of the forms of the present disclosure disclosed in this specification or application are exemplified only for the purpose of describing the forms according to the present disclosure. The forms according to the present disclosure may be implemented in various forms, and should not be construed as being limited to the forms described in this specification or application.

Since the forms according to the present disclosure can be modified in various ways and have various forms, specific forms will be illustrated in the drawings and described in detail in the present specification or application. However, this is not intended to limit the forms according to the concept of the present disclosure to a specific form of disclosure, and it should be understood that all changes, equivalents, and substitutes included in the spirit and scope of the present disclosure are included.

Terms such as first and/or second may be used to describe various components, but the components should not be limited by the terms. The above terms are only for the purpose of distinguishing one component from other components. For example, without departing from the scope of the rights according to the concept of the present disclosure, the first component may be named as the second component, and similarly, the second component may also be referred to as a first component.

When a component is referred to as being "connected" or "contacted" to another component, it should be understood that it may be directly connected or contacted to the other component, but other components may exist in the middle. On the other hand, when a component is referred to as being "directly connected" or "directly contacted" to another component, it should be understood that there is no other component in the middle. Other expressions describing the relationship between components, such as "between" and "just between" or "adjacent to" and "directly adjacent to" should be interpreted as well.

The terms used in the present specification are only used to describe specific forms, and are not intended to limit the present disclosure. Singular expressions include plural expressions unless the context clearly indicates otherwise. In the present specification, terms such as "comprise" or "have" are intended to designate the presence of a set feature, number, step, action, component, part, or combination thereof, but it is to be understood that the presence or additional possibilities of one or more other features, numbers. steps, actions, components, parts, or combinations thereof are not preliminarily excluded.

Unless otherwise defined, all terms used herein, including technical or scientific terms, have the same meaning as commonly understood by one of ordinary skill in the art to which the present disclosure belongs. Terms such as those defined in a commonly used dictionary should be interpreted as having a meaning consistent with the meaning of the related technology, and should not be interpreted as an ideal or excessively formal meaning unless explicitly defined in the present specification.

Hereinafter, the present disclosure will be described in detail by describing exemplary forms with reference to the accompanying drawings. The same reference numerals shown in each drawing indicate the same members.

Referring to FIGS. 1 to 10, a space division device according to some forms of the present disclosure may include: a rail that is installed in a straight line along a first direction on an upper side of a space box 1, a drive module 5 that is installed to be movable along the rail, and a first partition 7 that is connected to the drive module 5 and is configured to form a surface in a second direction perpendicular to the first direction to partition an inner space of the space box 1.

In this form, the rail is composed of an upper rail 3 installed on the upper side of the space box.

That is, in the present disclosure, the drive module 5 can move along the upper rail 3. Thus, as the position of the drive module 5 is changed, the inner space of the space box 1 can be divided into various states (e.g., various size spaces) by the first partition 7.

Here, the first direction may be the longest length direction of the space box 1 as illustrated in FIG. 1 when the space box 1 constitutes a rectangular parallelepiped space.

In addition, the upper rail 3 can be provided with at least two partition modules 9 including the drive module 5 and the first partition 7.

In this case, a user can divide and use the space box 1 into a number of various spaces by arranging the partition modules 9 in various positions along the upper rail 3 as illustrated in FIG. 1.

For reference, in FIG. 1, a second partition to be described later is used together.

Meanwhile, a lower rail 11 is provided parallel to the upper rail 3 at the lower side of the space box 1, and the lower end of the first partition 7 can be configured to be guided by the lower rail 11.

Figure 5:
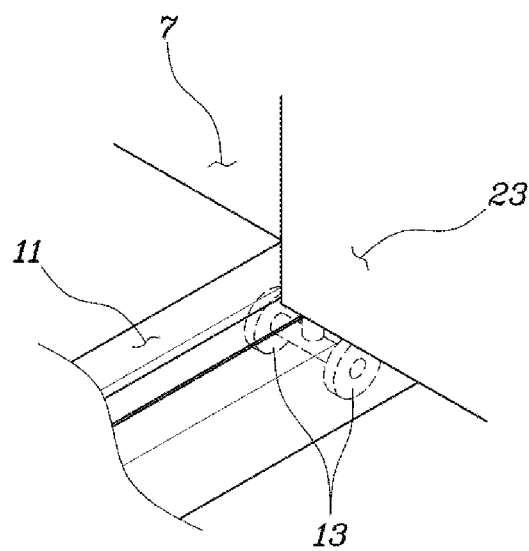
FIG. 5 is a diagram showing a lower rail and a second roller.
Figure 6:
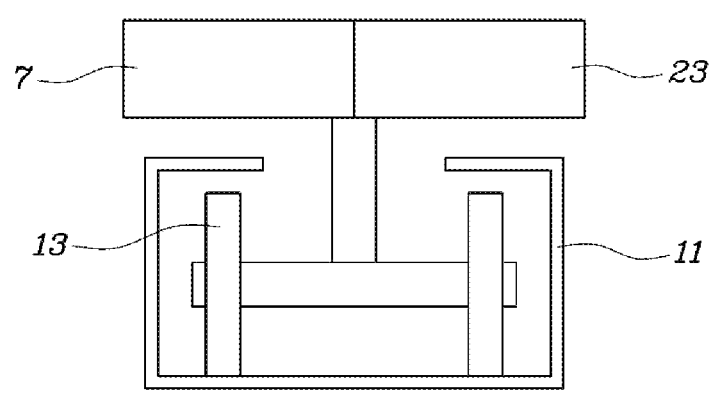
FIG. 6 is a diagram of a lower rail and a second roller viewed along the longitudinal direction of the lower rail.
Figure 7:
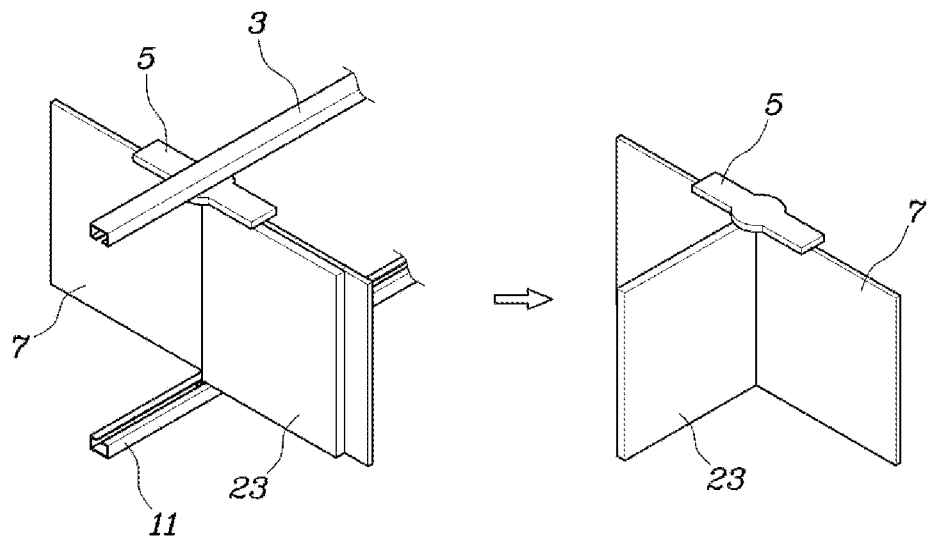
FIG. 7 is a diagram explaining the rotation of a second partition.

That is, a second roller 13 of which rolling motion is guided by the lower rail 11 may be provided at the lower end of the first partition 7 as illustrated in detail in FIGS. 5 and 6.

Therefore, when the first partition 7 moves along the first direction together with the drive module 5, the lower side thereof is guided along the lower rail 11 by the second roller 13 and is moved. Accordingly, a part of the load applied to the drive module 5 and the upper rail 3 is distributed to the second roller 13 and the lower rail 11, so that smooth movement is possible.

In addition, even in a state in which the movement of the first partition 7 is completed, the load of the first partition 7 can be stably supported, so that the durability of the space division device of the present disclosure can be improved.

The drive module 5 is configured to include a first roller 15 of which rolling motion is guided by the upper rail 3, a drive motor 17, and a drive worm 21 that is rotated by the rotational force of the drive motor 17 while engaged with the rack gear 19 provided long on the upper rail 3 along a longitudinal direction.

Accordingly, when the drive motor 17 is rotated, the drive module 5 moves along the rack gear 19 of the upper rail 3 as the drive worm 21 rotates.

In addition, as described above, when the drive motor 17 is stopped at the position where the drive module 5 is moved relative to the upper rail 3, a self-locking state that is automatically fixed is formed by the engagement of the drive worm 21 and the rack gear 19. Accordingly, the stability of the spaces divided by the first partition 7 is secured.

Meanwhile, the drive module 5 may further include a second partition 23 that can be rotated with respect to the first partition 7 with a long axis of rotation in the vertical direction.

For reference, in the present form, each of the second partitions 23 is provided symmetrically with respect to a direction of both surfaces of the first partition 7. But only one second partition 23 may be provided on either surface or may not be provided at all.

As described above, FIG. 1 shows the space box 1 that is divided and partitioned into various sizes by the first partition 7 and the second partition 23.

Here, the second partition 23 does not necessarily need to be rotated up to a vertical state with respect to the first partition 7 as shown in FIG. 1, but it may be rotated in a state that is obliquely inclined, so that the space can be partitioned in more various shapes.

As described above, in order to rotate the second partition 23 with respect to the first partition 7, the drive module 5 may include a partition rotation motor 25 that provides a rotational force to rotate the second partition 23, and a reducer 27 that decelerates the power of the partition rotation motor 25 and transmits it to the second partition 23.

Figure 8:
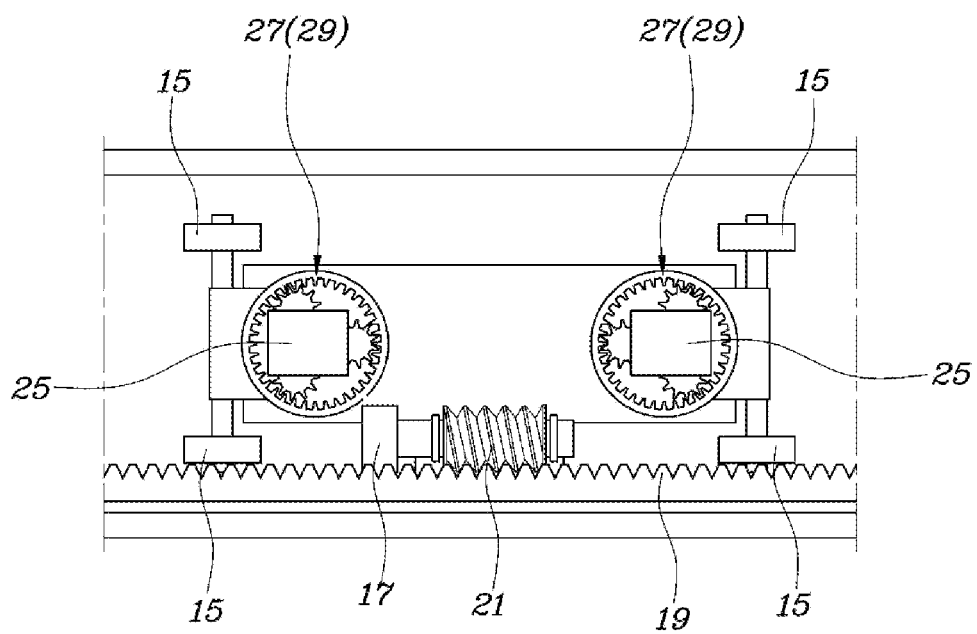
FIG. 8 is a diagram showing a partition rotation motor and a reducer provided in a drive module, as viewed from the top of the drive module.
Figure 9:
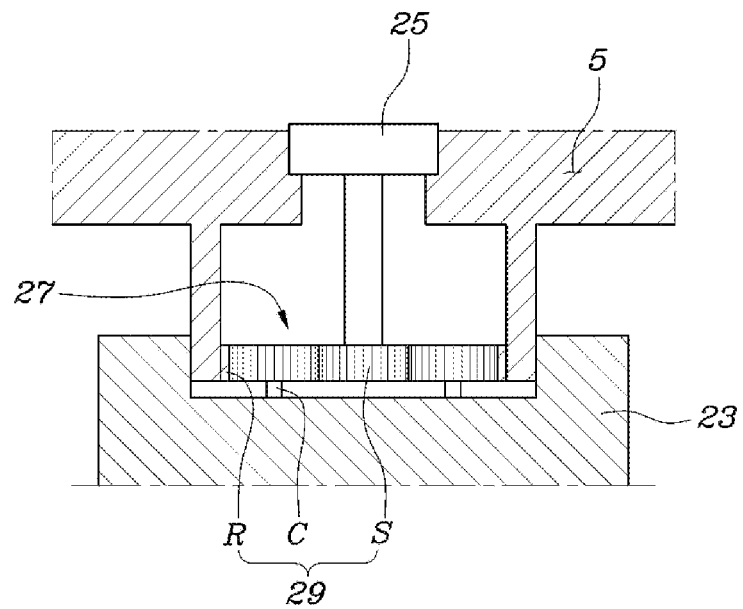
FIG. 9 is a diagram explaining the connection structure of a partition rotation motor and a reducer.
Figure 10:
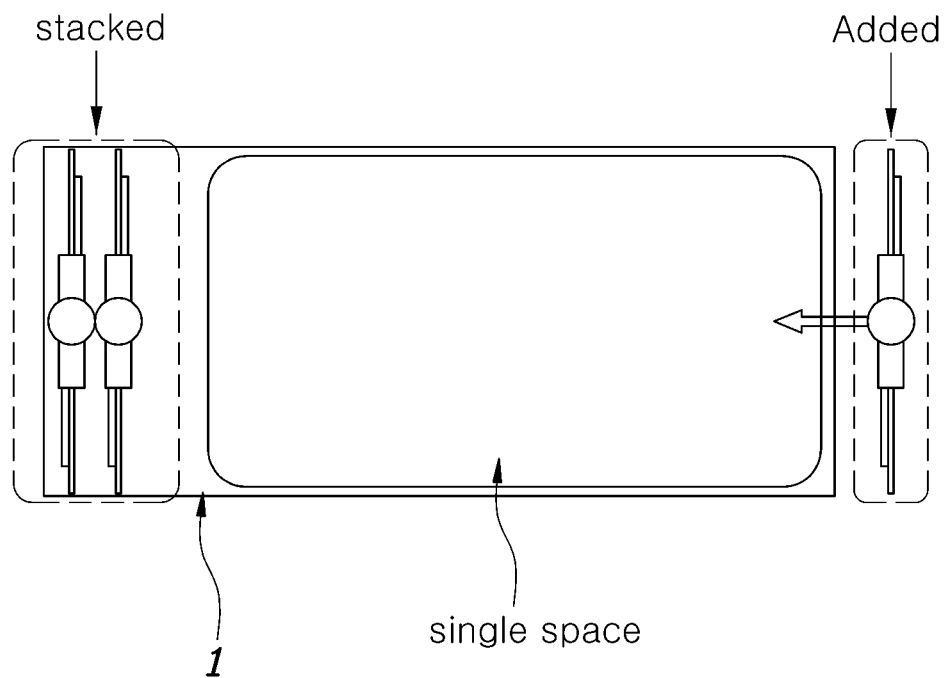
FIG. 10 is a diagram explaining any one state to which one form of the present disclosure is applied.

Although the reducer 27 may be configured as a simple external gear train, in this form, the reducer 27, as illustrated in FIGS. 8 and 9, may be configured as a single pinion planetary gear device 29 in which a ring gear R is fixed to the drive module 5, a sun gear S is connected to the rotation shaft of the partition rotation motor 25, a carrier C is connected to the second partition 23.

If the reducer 27 is configured as described above, as shown in FIG. 9, the portion fixing the ring gear R to the drive module 5 can play the role of a rotation shaft supporting the rotation of the second partition 23 with respect to the drive module 5, so that the device of the present disclosure can have a compact configuration with a simple structure. On the other hand, the rotational force from the partition rotation motor 25 input to the sun gear S is reduced and increased torque is output to the carrier C, so that the second partition 23 can be smoothly rotated.

Meanwhile, in the partition module 9 as described above and shown in FIG. 10, a plurality of the second partitions 23 can be stacked on one side as shown on the left side of the drawing by overlapping each other in a state in which the second partitions 23 are parallel to the first partition 7. Thus, a single space can be easily formed inside the space box 1. If desired, a new partition module 9 can be newly added or removed as shown on the right side of the drawing, so that the space of the space box 1 can be divided and used in more various states.

The addition or removal of the new partition module 9 as described above can be easily performed by inserting or removing the drive module 5 and the second roller 13 into the upper rail 3 and the lower rail 11, respectively.

Meanwhile, the drive motor 17 and the partition rotation motor 25 of the drive module 5 may be changed to other types of actuators, such as a hydraulic motor, depending on the situation of the space box 1 to be used.

In this form, the drive module is configured to be movable along the upper rail, but the drive module may be configured to be movable along the lower rail, and accordingly, the upper rail may be provided with a first roller corresponding to the second roller.

In addition, by installing a configuration similar to that of the drive module at both ends of the first partition in a width direction, and having a left rail and a right rail corresponding thereto, a space division device similar to the form of the present disclosure may be constituted.

Although the present disclosure has been illustrated and described in connection with exemplary forms, it will be obvious to those of ordinary skill in the art that the present disclosure can be variously improved and changed within the scope of the technical spirit of the present disclosure.

What is claimed is:

1. A space division device, comprising:
    a rail installed in a space box along a first direction of the space division device;
    a drive module configured to move along the rail; and
    a first partition connected to the drive module and configured to form a surface in a second direction perpendicular to the first direction, the first partition configured to partition an inner space of the space box,
    wherein the drive module includes at least one second partition configured to be rotated with respect to the first partition around a long axis of rotation in a vertical direction of the space division device.

2. The space division device of claim 1, wherein the rail is an upper rail installed on an upper side of the space box.

3. The space division device of claim 2, further comprising: a lower rail provided at a lower side of the space box and configured to be parallel to the upper rail,
    wherein a lower end of the first partition is configured to be guided by the lower rail.

4. The space division device of claim 3, further comprising: a second roller provided at the lower end of the first partition, wherein a rolling motion of the second roller is guided by the lower rail.

5. The space division device of claim 1, wherein the drive module comprises;
    a first roller, wherein a rolling motion of the first roller is guided by the rail;
    a drive motor configured to provide a rotational force; and
    a drive worm configured to be rotated by the rotational force of the drive motor while engaged with a rack gear provided on the rail.

6. The space division device of claim 1, wherein the at least one second partition includes a plurality of second partitions, and each second partition of the plurality of second partitions is provided symmetrically with respect to a direction of surfaces of the first partition.

7. The space division device of claim 1, wherein the drive module further includes:
    a partition rotation motor configured to provide a rotational force to rotate the at least one second partition; and
    a reducer configured to reduce a power of the partition rotation motor and transmit the power to the at least one second partition.

8. The space division device of claim 7, wherein the reducer comprises a single pinion planetary gear device, and the single pinion planetary gear device includes: a ring gear fixed to the drive module, a sun gear connected to a rotation shaft of the partition rotation motor, and a carrier connected to the at least one second partition.

9. The space division device of claim 1, further comprising at least two partition modules provided on the rail and each including the drive module and the first partition.

10. A space division device, comprising:
    a rail installed in a space box along a first direction of the space division device;
    a drive module configured to move along the rail;
    a first partition connected to the drive module and configured to form a surface in a second direction perpendicular to the first direction, the first partition configured to partition an inner space of the space box; and
    at least two partition modules provided on the rail and each including the drive module and the first partition.

* * * * *